United States Patent Office 2,993,844
Patented July 25, 1961

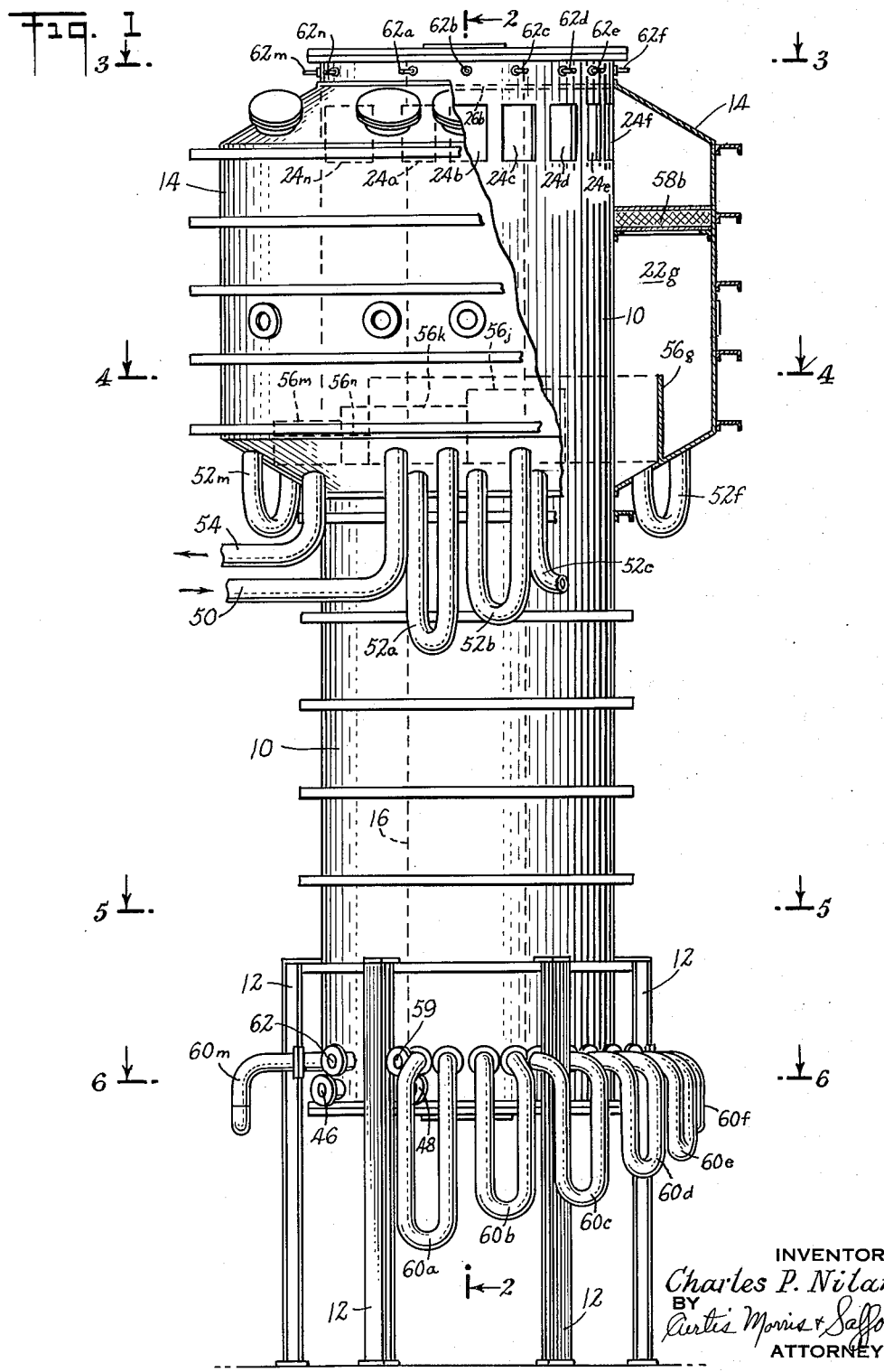

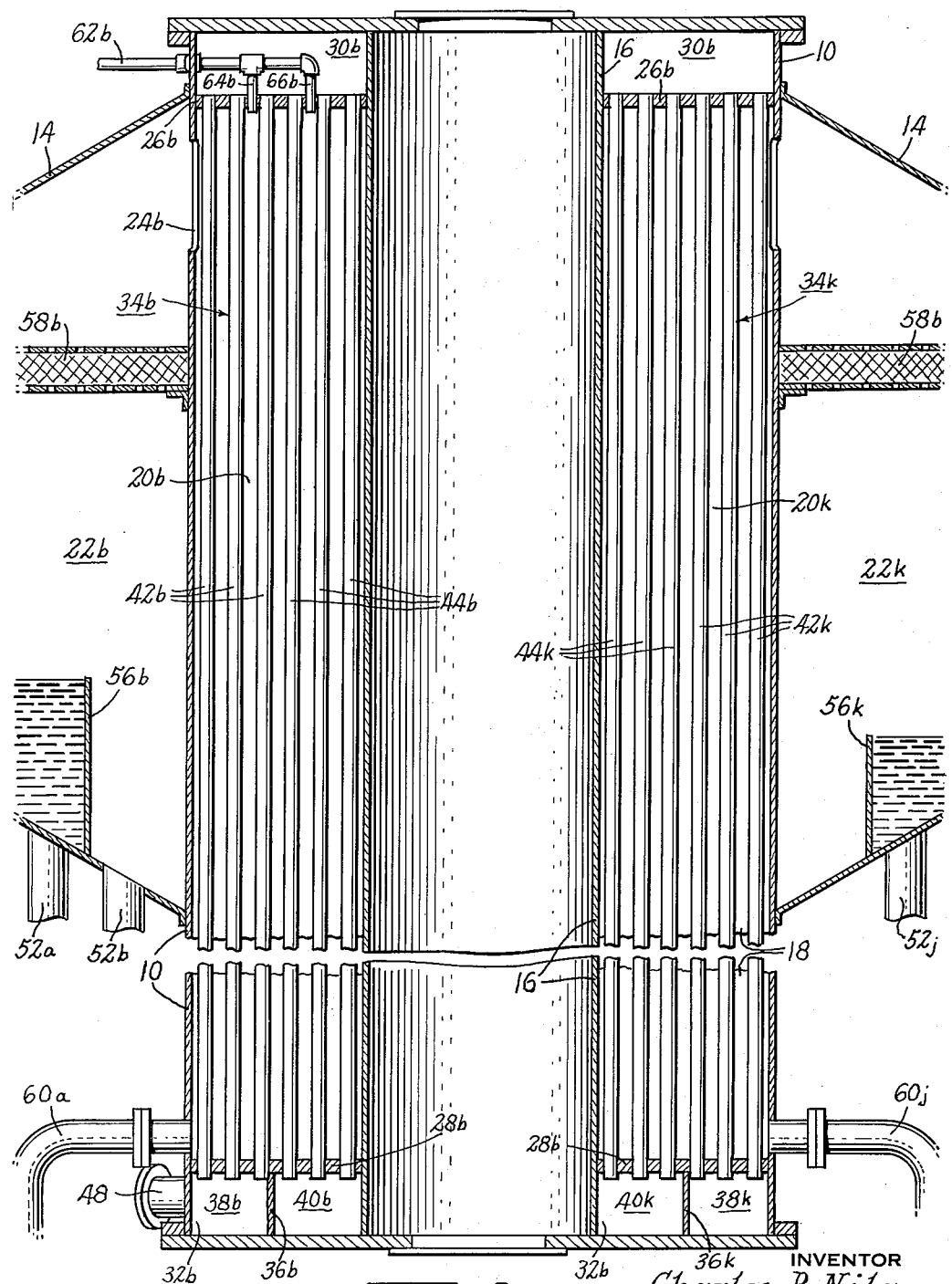

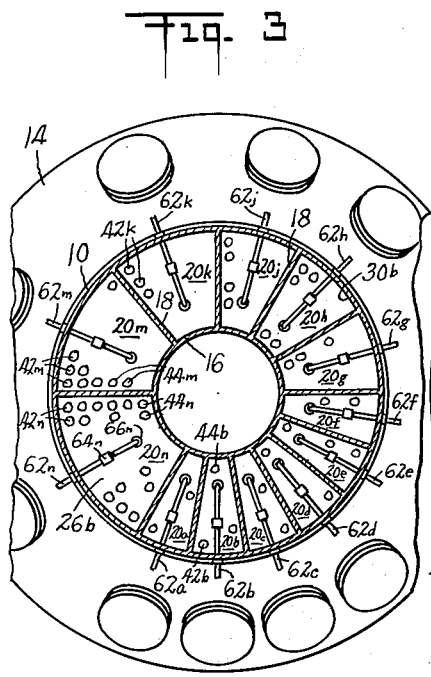
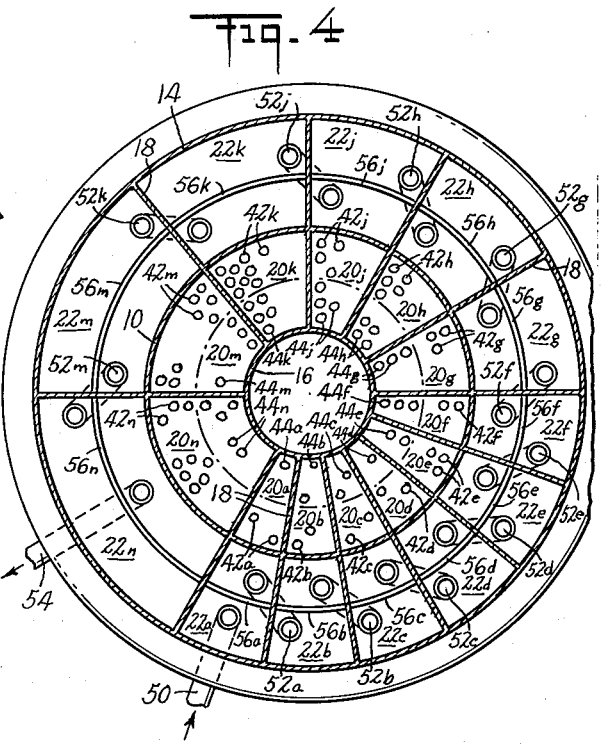
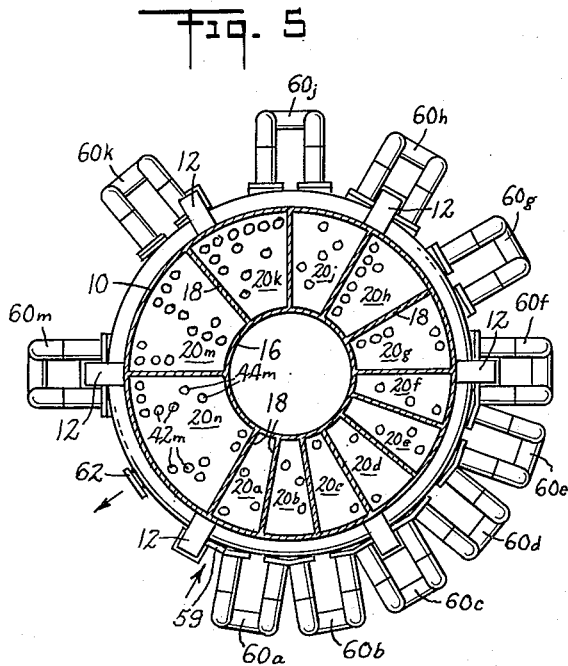
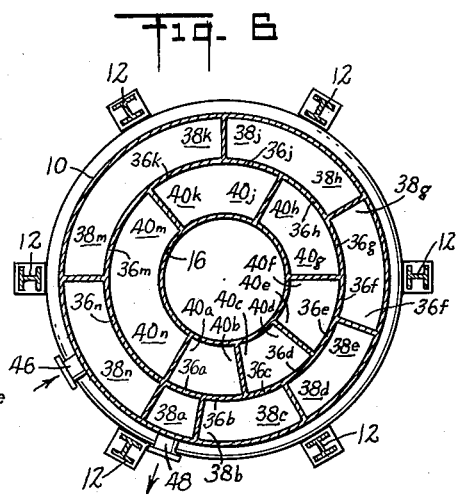

2,993,844
MULTI-STAGE FLASH EVAPORATOR
Charles P. Nilan, Rye, N.Y., assignor to Chicago Bridge & Iron Company, Chicago, Ill., a corporation of Illinois
Filed May 13, 1958, Ser. No. 735,055
10 Claims. (Cl. 202—173)

This invention relates to the field of evaporation and more particularly to a novel type of flash evaporative heater adapted to be used as a feed preheater for a continuous evaporator or still. The heater of the present invention is especially useful in connection with the evaporation of sea water brines to produce fresh water and will be illustratively described as used for this purpose. However, as the description proceeds it will become apparent that the heater can also be used with advantage in many other applications where efficient interchange of heat between a relatively hot liquid and a relatively cool liquid is desired.

In order to produce fresh water by evaporation of sea water at a reasonable cost a system having a high thermal efficiency is required. To achieve this efficiency the sensible heat present in the effluent liquor from the evaporator must be quite fully utilized to preheat the incoming brine before it enters the evaporator. It has been previously proposed that the overall economy of such evaporating system be increased by using an evaporative preheater wherein a portion of the effluent is flash vaporized and the resulting vapor is used to heat the incoming brine. The condensate formed from this flash vapor can be added to the distillate from the evaporator to increase substantially the quantity of water produced per pound of boiler steam. By carrying out such evaporative preheating in a relatively large number of stages the economy of the system can be substantially improved. However, the use of such a large number of stages of evaporative preheating substantially increases the cost of equipment required for a given rate of distilled water production.

It is accordingly an object of the present invention to provide improved apparatus for preheating the feed liquor to an evaporator by multi-stage flash evaporation of the effluent liquor and utilization of the flash vapors as a heating medium. It is another object of the invention to provide a compact, unitary apparatus for carrying out multi-stage evaporative preheating of a liquor to be evaporated. It is still another object of the invention to provide an apparatus for carrying out a substantial number of simultaneous evaporative preheating operations, which apparatus is less expensive to construct than the multi-stage heaters that have been previously proposed for this general purpose. Other objects of the invention will be in part obvious and in part pointed out hereafter.

The many objects and advantages of the present invention can best be understood and appreciated by reference to the accompanying drawings which illustrate a heater incorporating a preferred embodiment of the invention wherein:

FIGURE 1 is a general side view of the heater cut away to show one of the flash chambers in section and also to show several of the vapor ports that establish communication between the flash chambers and the central portion of the heater;

FIGURE 2 is a compacted vertical axial section through the heater on an enlarged scale, showing the general relationship between the banks of heat exchange tubes and the flash chambers;

FIGURE 3 is a horizontal section taken on the line 3—3 of FIGURE 1, showing portions of the radial partitions which divide the heater to separate compartments and the vent tubes trough which non-condensible gases are vented from the several compartments of the heater;

FIGURE 4 is a horizontal section taken on the line 4—4 of FIGURE 1, showing further details of the radial partitioning of the interior of the heater into separate compartments;

FIGURE 5 is a horizontal section taken on the line 5—5 of FIGURE 1, particularly showing the transfer conduits for transfering condensate from one compartment to another of the heater; and, FIGURE 6 is a horizontal section taken on the line 6—6 of FIGURE 1, particularly showing the partitioning at the bottom of the heater that directs the flow of the liquor to be heated to and through the several tube banks of the heater.

Referring to the drawing and more particularly to FIGURE 1, the heater there shown comprises a vertically arranged elongated casing 10 having flanged sections and supported on the legs 12. Near the top of the heater there is a section 14 of enlarged diameter within which there is a circumferentially arranged series of flash chambers which will be described in detail hereafter.

Referring now to FIGURE 4 of the drawing, the heater has a hollow cylindrical core 16 from which a series of partitions 18 extend radially outward to divide the heater into a series of compartments 20a, 20b, 20c, 20d, 20e, 20f, 20g, 20h, 20j, 20k, 20m and 20n. The compartments 20a to 20n are essentially defined by a pair of adjacent radial partitions 18, the wall of cylindrical core 16 and the casing 10. As shown in FIGURE 4 the partitions 18 extend outwardly into the enlarged diameter section 14 of the heater and thereby form, in enlarged section 14, a series of flash chambers 22a, 22b, 22c, 22d, 22e, 22f, 22g, 22h, 22j, 22k, 22m and 22n. Each of the flash chambers 22a to 22n communicates with a corresponding compartment 20a to 20n through a port in the casing 10, a number of the ports being shown in FIGURE 1. Thus near the top of FIGURE 1 there is shown the port 24a which interconnects flash chamber 22a with compartment 20a, the port 24b which interconnects flash chamber 22b and compartment 20b, the port 24c that interconnects flash chamber 22c and compartment 20c and the port 24d that interconnects flash chamber 22d and compartment 20d. The flash chambers 22a to 22n may be considered as forming part of the compartments 20a to 20n respectively.

Reverting to FIGURE 4, within the several compartments 20a to 20n of the heater there are banks of tubes through which liquor to be heated flows, and these tubes are externally heated by vapors generated in the flash chambers 22a to 22n of the heater. Turning to FIGURE 2 of the drawings which is a vertical section taken through the compartments 20b and 20k of the heater, there are mounted within the compartment 20d a pair of vertically spaced tube sheets 26b and 28b which define, with the top and bottom of the heater respectively, an upper chamber 30b and lower chamber 32b. Mounted in and extending between the tube sheets 26b and 28b are the tubes 34b through which flows the liquor to be heated. The lower chamber 32b is divided by a partition 36b into the chambers 38b and 40b. As best shown in FIGURE 6 of the drawing the partition 36b is a segment of a circle, and combined with the corresponding partitions of the other compartments 20a to 20n, forms a complete circle. The liquid to be heated makes two passes in each of the compartments 20a to 20n and the partition 36b (see FIGURE 2) has the effect of dividing the tubes 34b into two banks 42b and 44b. In like manner each of compartments 20a to 20n contains two two banks of tubes 42a to 42n and 44a to 44n respectively.

The flow of the liquid to be heated can be best explained with reference to FIGURES 4 and 6 of the drawings. Referring to FIGURE 6, the liquor to be heated enters the heater and more particularly the liquor inlet compartment $38n$ thereof through a connection 46 located near the bottom of the heater. Because of the partition $36n$ the entering liquor is caused to flow upwardly through a first bank of tubes $42n$ to the top of the heater. At the top of the heater (see FIGURE 4) the liquor flows toward the center of the heater and then downwardly through the tube bank $44n$ to the chamber $40n$ (see FIGURE 6) near the bottom of the heater. Chamber $40n$ is in free communication with chamber $40m$ of compartment $20m$ and hence the liquor flows into compartment $40m$ and is then directed upwardly, because of partition $36m$, through tubes $44m$ of compartment $20m$. Referring to FIGURE 4, the liquor leaving the tops of tubes $44m$ flows away from the center of the heater and then downwardly through tubes $42m$ to chamber $38m$. In like manner the liquor flows through the tube banks of the other compartments of the heater in a generally clockwise direction, making two passes in each compartment, and finally reaches the chamber $38a$ of compartment $20a$ from which it leaves the heater through a discharge connection 48.

As has been previously indicated, each of the compartments $20a$ to $20n$ is in communication through one of the ports $24a$ to $24n$ with one of the flash chambers $22a$ to $22n$ respectively. The hot liquor that is used to heat the liquor within the tubes flows in a direction generally counter-current to the liquor to be heated, i.e. as viewed in FIGURE 4, the hot liquor flows in a generally counter-clockwise direction. Referring to FIGURE 4 of the drawings, hot liquor which is to be flash evaporated within the heater enters the flash chamber $22a$ through a supply pipe 50. Within the chamber $22a$ a portion of the hot liquor is flashed into vapor which flows through the port $24a$ into compartment $20a$ and around the tubes of that compartment. The unflashed liquor is transferred by a pipe $52a$ (see also FIGURE 1) to the flash chamber $22b$. The chamber $22b$ is at a lower pressure than chamber $22a$ and hence a further portion of the hot liquor vaporizes in chamber $22b$. The vapor thus formed passes through port $24b$ into contact with the exterior of the tubes in compartment $20b$ and gives up its heat to the liquor flowing through the tubes. As shown in FIGURE 1 the transfer pipe $52a$ is U-shaped and provides a liquid seal between the flash chambers $22a$ and $22b$. In like manner the hot liquor is transferred successively through the transfer pipes $52b$ to $52m$ to flash chambers $22c$ to $22n$ respectively which are maintained at successively lower pressures, and portions of the hot liquor flashes into vapor in each flash chamber. The vapor formed in each case is used to supply heat to liquor flowing through the tubes of a corresponding compartment $20c$ to $20n$. By the time the hot liquor reaches flash chamber $22n$ it is relatively cool and is withdrawn from the heater through a pipe 54.

Flash chambers $22a$ to $22n$ are similar in construction and hence only one need be described in detail. Referring to the left-hand portion of FIGURE 2, the hot liquor flows into the flash chamber $22b$ from transfer pipe $52a$. In order to promote evaporation of the liquor in flash chamber $22b$, there is provided within the flash chamber a dam $56b$ over which the hot liquor flows. The dam $56b$ (see FIGURE 4) is a segment of a circle and when taken with the corresponding dams of the other flash chambers forms a complete circle. The unflashed liquor leaves flash chamber $22b$ through the transfer pipe $52b$ and passes on to the next flash chamber. Mounted in the flash chamber $22b$ there is a filter member $58b$ that is of conventional construction and is so positioned that the vapors generated within the flash chamber must pass therethrough before flowing through the port $24b$ into the compartment $20b$. Filter member $58b$ serves to remove droplets of moisture from the generated vapors.

Within the several compartments of the heater, the flash vapors give up their heat to the liquor flowing through the tubes of the several tube banks and are thereby condensed to form condensate that drops to the lower tube sheet 28 in each compartment. Referring to FIGURES 1 and 5 of the drawings, condensate accumulating in compartment $20a$ is transferred through a U-shaped transfer pipe $60a$ to compartment $20b$ and condensate accumulating in compartment $20b$ is transferred through a U-shaped transfer pipe $60b$ into compartment $20c$. In like manner the condensate is transferred successively to the several compartments of the heater through a series of U-shaped transfer pipes $60c$ to $60n$ respectively. Since the compartments are maintained at successively lower pressures a portion of the condensate entering each compartment flashes into vapor and mingles with the vapor coming from the flash chamber of that compartment. The condensate accumulating in compartment $20n$ is withdrawn from the apparatus through the outlet connection 62. In cases where the present heater is used in conjunction with a sea water evaporator, this condensate can be combined with the condensate produced by the evaporator to improve the over-all economy of the system. As shown in FIGURES 1 and 5, compartment $20a$ is provided with a condensate inlet connection 59 through which condensate from such an evaporator can be introduced into the heater.

Referring particularly to FIGURE 2, and also generally to FIGURES 1 and 3, in order to provide for removal of non-condensible gases from the compartment $20b$, there is a vent pipe $62b$ having the branches $64b$ and $66b$ that are mounted in the upper tube sheet $26b$ and communicate with the interior of compartment $20b$ outside the tubes $34b$. The vent tube $62b$ extends through casing 10 to a suitable vacuum pump (not shown). In like manner compartments $20a$ and $20c$ to $20n$ are provided with the vent tubes $62a$ and $62c$ to $62n$ respectively, through which non-condensible gases may be withdrawn from the several compartments of the heater.

As has been previously pointed out the vapor pressure and likewise the vapor temperature within the heater decrease progressively from compartment $20a$ to compartment $20n$. Usually the apparatus is so operated that the vapor temperature decreases by approximately equal amounts from compartment to compartment, which means that the pressure difference between successive compartments also decreases progressively. From this it follows that the height of the liquid seals between adjacent compartments should likewise decrease. Thus as indicated in FIGURE 1 of the drawings, the height of the hot liquor transfer pipes $52a$ to $52m$ is progressively decreased from flash chamber $22a$ to flash chamber $22n$. In like manner the condensate transfer pipes $60a$ to $60m$ are made progressively shorter.

The method of operation of the present apparatus should be largely apparent from the foregoing description. The liquor to be preheated, e.g. sea water brine, flows in sequence through the tubes of compartments $20n$ to $20a$. The heating liquor enters flash chamber 22 of the heater and flows in a direction that is generally countercurrent to the flow of liquor to be heated, i.e. successively through the flash chambers $22a$ to $22n$. In each flash chamber a portion of the hot liquor is flashed into vapor and this vapor is used to heat the liquor flowing through the tubes of that compartment.

In order to point out more fully the mode of operation of the present apparatus the following illustrative example of the flow and conditions in an apparatus of the type disclosed is given. In accordance with this example, 450,000 lbs. per day of brine at a temperature of 80.25° F. is fed to chamber $38n$ of compartment $20n$ of the heater and flows through the tubes of the several compartments of the heater as described above. The preheated brine then flows to a conventional multiple effect evaporator (not shown) which produces 53,800 lbs. per day of condensate at a temperature of 211° F. and 402,350 lbs. per day of effluent brine at a temperature of 206.25° F. The condensate from the evaporator at 211° F. is fed through connection 59 into the lower portion of compartment 20a and flows successively through the compartments 20a to 20n in the manner described. The effluent brine from the evaporator at 206.25° F. is fed through pipe 50 into flash chamber 22a where a portion of this brine vaporizes to form vapors that flow into contact with the tubes in compartment 20a. This hot brine then passes on successively through flash chambers 22b to 22n as previously described. The vapor temperatures in the several flash chambers are approximately as follows: 22a—197.75°; 22b—188.5°; 22c—179.75°; 22d—170°; 22e—160.75°; 22f—151.5°; 22g—142.25°; 22h—133°; 22j—123.75°; 22k—144.5°; 22m—105.25°; 22n—96°. Under these conditions the 450,000 lbs. per day of feed brine is preheated within the heater to 191.5° F. The effluent liquor leaving the last flash chamber 22n amounts to 360,440 lbs. at a temperature of 96.5° F. The total distillate leaving compartment 20n through discharge connection 62 amounts to 95,710 lbs. per day.

From the foregoing description it should be apparent that the present invention provides an unusually compact apparatus for achieving efficient multi-stage transfer of heat from a relatively hot liquor to a relatively cold liquor. By successive flash evaporation of the hot liquor a substantial quantity of distillate is produced from the hot liquor at the same time that the transfer of heat to the cooler liquor is being accomplished.

It is of course to be understood that the foregoing description is illustrative only and that numerous changes may be made in the specific structure disclosed without departing from the spirit of the invention. Thus it is apparent that the number of compartments 20a to 20n and flash chambers 22a to 22n may be varied if a greater or lesser number of stages is desired. In the specific embodiment described the liquor to be heated makes two passes in each of the compartments 20a to 20n. However, under certain circumstances a single pass through each compartment may be sufficient whereas in other cases more than two passes in each compartment may be required. Other modifications within the scope of the invention will be apparent to those skilled in the art.

I claim:

1. A multi-stage flash heater for heating a first liquor with vapor evaporated from a second liquor, comprising in combination, an elongated casing having a pair of spaced tube sheets mounted therein, the portion of said casing between said tube sheets, being radially divided into a series of compartments adapted to be maintained at successively lower pressures, banks of heat-exchange tubes mounted at their ends in said spaced tube sheets and located in said compartments, partitions at the opposite ends of said banks of tubes for directing the flow of said first liquor from the tubes of one bank to the adjacent ends of the tubes of another bank, whereby said first liquor flows in series through said banks of tubes, means for introducing said second liquor into one of said compartments, and transfer means for transferring said second liquor from each compartment to another compartment at a lower pressure whereby a portion of said second liquor flash vaporizes in each compartment and the vapor thus formed comes into heat exchange relation through the walls of said tube with the first liquor flowing through said tubes.

2. A multi-stage flash heater for heating a first liquor with vapor evaporated from a second liquor, comprising in combination, an elongated casing having a pair of spaced tube sheets mounted therein, the portion of said casing between said tube sheets being radially divided into a series of compartments adapted to be maintained at successively lower pressures, banks of heat exchange tubes mounted at their ends in said spaced tube sheets and located in said compartments, partitions at the opposite ends of said tube banks for directing the flow of said first liquor from the tubes of one bank to the adjacent ends of the tubes of another bank whereby said first liquor flows in series through said banks of tubes, first transfer means for transferring said second liquor from each compartment to another compartment at a lower pressure, whereby a portion of said second liquor vaporizes in each compartment and the vapor thus formed comes into heat exchange relation through the walls of said tubes with the first liquor flowing through said tubes and is thereby condensed, and second transfer means for transferring condensate from each compartment to another compartment at a lower pressure.

3. A heater according to claim 2 and wherein said first and second transfer means are U-tubes interconnecting adjacent compartments and providing liquid seals therebetween.

4. A multi-stage flash heater for heating a first liquor with vapor evaporated from a second liquor, comprising in combination, an elongated casing having a pair of spaced tube sheets mounted therein, the portion of said casing between said tube sheets being radially divided into a series of compartments adapted to be maintained at successively lower pressures, said series of compartments including an inlet compartment and adjacent outlet compartment, banks of heat exchange tubes mounted at their ends in said spaced tube sheets and located in the compartments of said series, partitions at the opposite ends of said tube banks for directing the flow of said first liquor from the tubes of one bank to the adjacent ends of the tubes of another bank, whereby said first liquor flows in series through said banks of tubes, means for supplying first liquor to one end of the tubes of a tube bank in said inlet compartment, means for withdrawing first liquor from one end of the tubes of a tube bank in said outlet compartment, means for supplying said second liquor to said outlet compartment, transfer means for transferring said second liquor from each compartment to another compartment at a lower pressure, whereby a portion of said second liquor vaporizes in each compartment and the vapor thus formed comes into heat exchange relation through the walls of said tubes with the first liquor flowing through said tubes, and means for withdrawing second liquor from said inlet compartment.

5. A multi-stage flash heater for heating a first liquor with vapor evaporated from a second liquor, comprising in combination an elongated casing having a pair of spaced tube sheets mounted therein, the portion of said casing between said tube sheets being radially divided into a series of compartments adapted to be maintained at successively lower pressures, banks of heat exchange tubes mounted at their ends in said spaced tube sheets and located in said compartments, said series of compartments including a series of flash chambers each communicating with the heat exchange tubes in one compartment of said series, partitions at the opposite ends of said tube banks for directing flow of said first liquor from the tubes of one bank to the adjacent ends of the tubes of another bank, whereby said first liquor flows in series through said banks of tubes, means for introducing second liquor into one of said flash chambers and transfer means for transferring said second liquor from each flash chamber to another flash chamber at a lower pressure, whereby a portion of said second liquor vaporizes in each flash chamber and the vapor thus formed flows into heat exchange relation through the walls of said tubes with the first liquor flowing through said tubes.

6. A heater according to claim 5 and wherein said flash chambers contain over-flow dams over which said second liquor flows to promote vaporization of a portion of said second liquor in said flash chambers.

7. A multi-stage flash heater for heating a first liquor with vapors evaporated from a second liquor, comprising in combination, an elongated casing having a pair of spaced tube sheets mounted therein, the portion of said casing between said tube sheets being radially divided into a series of compartments adapted to be maintained at successively lower pressures, said casing having a section of enlarged diameter near one end thereof, said enlarged diameter section being divided into flash chambers each of which communicates with a compartment of said series, banks of heat exchange tubes mounted at their ends in said spaced tube sheets within each of said compartments, partitions at the opposite ends of said tube banks for directing flow of said first liquor from the tubes of one bank to the adjacent ends of the tubes of another bank, whereby said first liquor flows in series through said banks of tubes, means for introducing said second liquor into one of said flash chambers, and transfer means for transferring said second liquor from each compartment to another compartment at a lower pressure whereby a portion of said second liquor vaporizes in each compartment and the vapor thus formed flows into heat exchange relation through the walls of said tubes with the first liquor flowing through said tubes.

8. A multi-stage flash heater for heating a first liquor with vapors evaporated from a second liquor, comprising in combination, an elongated casing having a pair of spaced tube sheets mounted therein, the portion of said casing between said tube sheets being radially divided into a series of compartments adapted to be maintained at successively lower pressures, each of said compartments containing two banks of heat exchange tubes mounted in and extending between said spaced tube sheets, a first set of partitions at one end of said tube banks for directing flow of said first liquor from the tubes of one bank to the tubes of another bank located in the same compartment, a second set of partitions located at the other end of said tube banks for directing flow of said first liquor from one bank of tubes in each compartment to another bank of tubes in an adjacent compartment, whereby said first liquor flows in series through said banks of tubes, means for introducing said second liquor into the highest pressure compartment, and transfer means for transferring said second liquor from each compartment to another compartment at lower pressure whereby a portion of said second liquor vaporizes in each compartment and the vapor thus formed comes into heat exchange relation with the heat exchange tubes of that compartment.

9. A multi-stage flash heater for heating a first liquor with vapor evaporated from a second liquor, comprising in combination, an elongated casing having a pair of spaced tube sheets mounted therein, the portion of said casing between said tube sheets being radially divided into a series of compartments including an inlet compartment and an outlet compartment, said compartments being adapted to be maintained at successively lower pressures, a series of flash chambers circumferentially arranged in a ring around said compartments, said compartments extending through said ring of flash chambers and each of said flash chambers being in communication with one of said compartments through an aperture in the wall thereof, each compartment having two banks of heat exchange tubes located therein, said heat exchange tubes being mounted in and extending between said spaced tube sheets, means for supplying said first liquor to the tubes of one tube bank in said inlet compartment, a first set of partitions at one end of said tube banks for directing flow of said first liquor from the tubes of one bank to the tubes of another bank within the same compartment, a second set of partitions for directing flow of said first liquor from the tubes of one bank in each compartment to the adjacent ends of the tubes of a bank in another compartment, whereby said first liquor flows in series through said banks of tubes from said inlet compartments to said outlet compartment, means for withdrawing first liquor from said outlet compartment, means for introducing said second liquor into the flash chamber that communicates with said outlet compartment, and transfer means for transferring said second liquor from each compartment to another compartment at a lower pressure, whereby a portion of said second liquor vaporizes in each compartment and the vapor thus formed flows into heat exchange relation through the walls of said tubes to the first liquor flowing through said tubes.

10. A heater according to claim 9 and wherein each of said compartments is provided with a vent tube for venting non-condensible gas therefrom.

References Cited in the file of this patent
UNITED STATES PATENTS

| | | |
|---|---|---|
| 896,460 | Prache et al. | Aug. 18, 1908 |

FOREIGN PATENTS

| | | |
|---|---|---|
| 926,485 | Germany | Mar. 17, 1955 |